United States Patent [19]

Perry

[11] 4,211,661
[45] Jul. 8, 1980

[54] FILTER MEDIUM

[75] Inventor: Gerald N. Perry, Nashville, Tenn.

[73] Assignee: Chave & Earley, Inc., New York, N.Y.

[21] Appl. No.: 1,717

[22] Filed: Jan. 8, 1979

[51] Int. Cl.² .................. B01D 25/02; B01D 29/04
[52] U.S. Cl. .................................. 210/491; 210/492; 210/496
[58] Field of Search ............. 210/483, 496, 500 R, 210/503, 505, 506, 508, 488–492; 55/524, 527, 528; 264/249; 428/300, 301

[56] References Cited

U.S. PATENT DOCUMENTS

| | | | |
|---|---|---|---|
| 3,476,626 | 11/1969 | Charlton et al. | 428/300 |
| 3,615,989 | 10/1971 | Depoe | 428/300 |
| 3,994,759 | 11/1976 | Stoller | 428/300 |
| 4,070,217 | 1/1978 | Smith et al. | 428/300 |

Primary Examiner—Frank Sever
Attorney, Agent, or Firm—Brumbaugh, Graves, Donohue & Raymond

[57] ABSTRACT

A method and apparatus of producing a filter medium of a relatively strong substrate and a fibrous felt layer bonded to the substrate by needle punching the felt through the substrate and fusing the fibers protruding through the perforations to the substrate and each other.

7 Claims, 4 Drawing Figures

FILTER MEDIUM

This invention relates to a filter medium for fluids.

More particularly, the invention relates to a filter medium which includes a relatively strong perforated substrate and a fibrous felt layer bonded to the surface of the substrate upstream to the flow of fluid to be filtered. The bond is achieved by punching needles through the fibrous felt layer and the substrate to form filtration perforations in the substrate and by fusing the fibers protruding through the perforations on the downstream surface of the substrate.

The filter medium of the present invention is unaffected by water and highly resistant to degradation from acid and alkaline fluids and can be used in pneumatic filtration systems to separate moisture and dust in liquid filtration systems to separate desirable or undesirable solids. More importantly, the filter medium can be used in either type of system to separate, trap and retain materials for which the fibrous felt layer has a strong affinity or attraction. For example, in a preferred embodiment of the filter medium the fibrous felt layer has excellent oil wetability characteristics and an attraction and affinity for and an ability to soak up undesirable high viscosity tramp oil. Thus, the filter medium is highly useful for filtering the higher viscosity tramp oil from a lower viscosity coolant oil in a circulating cooling system.

A particularly useful application of the filter medium of the present invention is in connection with filtering the oil coolant of the circulating cooling system for machines for making beverage cans from aluminum and steel. In such machines the metal particles and tramp oil, along with other undesirable dirt and debris, find their way into the coolant. The filter medium of the present invention has been found to have superior filtration capabilities in removing the metal particles, dirt, debris, but particularly the tramp oil, from the coolant over conventional filter media, such as nonwoven cellulose sandwiched between woven cotton fabrics heretofore used as a filter medium.

For a more complete understanding of the present invention, reference can be made to the detailed description which follows and to the accompanying drawings, in which.

Figure 1:
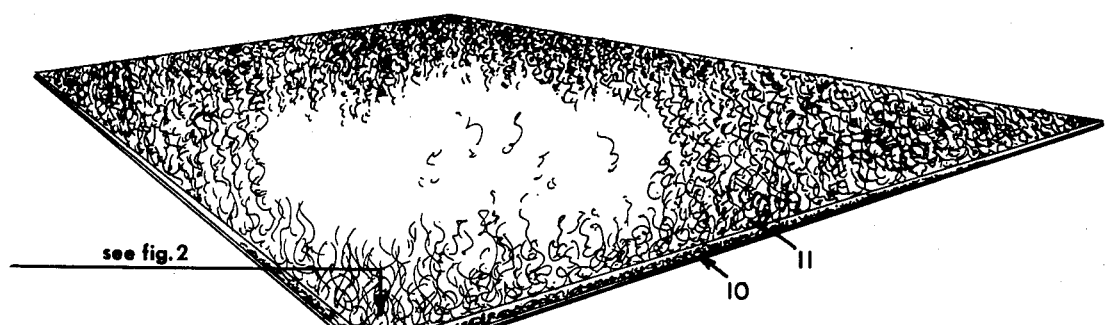
FIG. 1 is a schematic perspective of the filter medium of the present invention, as viewed from the upstream fibrous felt surface.
Figure 2:
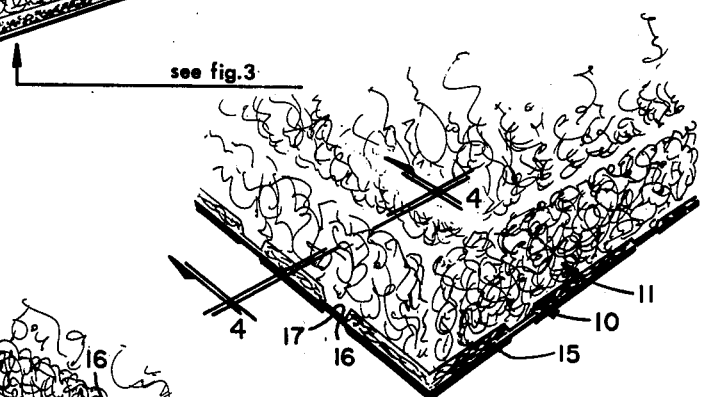
FIG. 2 is an enlarged view of a portion of the filter medium shown in FIG. 1.
Figure 3:
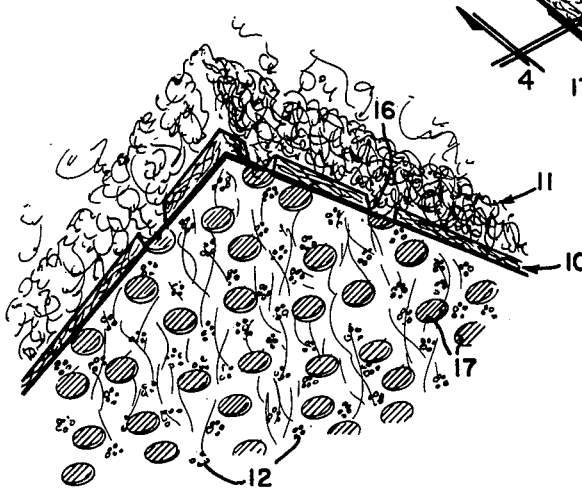
FIG. 3 is an enlarged view of the filter medium of FIG. 1 as viewed from the downstream or substrate surface.
Figure 4:
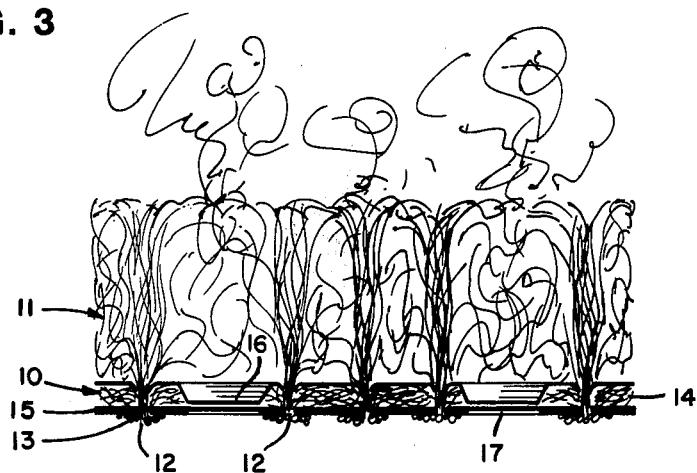
FIG. 4 is an enlarged cross-sectional view taken along line 4—4 of FIG. 2 looking in the direction of the arrows.

The filter medium of the present invention, as shown schematically in the drawings, includes a relatively strong substrate 10 and a fibrous felt layer 11 on the surface of the substrate upstream to the flow of fluid to be filtered. The fibrous felt is bonded to the substrate by needles punched through the fibrous layer and the substrate to form filtration perforations 12 in the substrate. The substrate perforating operation punches fibers of the fibrous felt layer 11 into and through the perforations 12, and the fibers penetrating and protruding through the perforations are fused on the downstream surface of the substrate, as indicated by the fused fibers designated 13 in the drawings, to interlock the layers together.

The filter medium is preferably made of materials unaffected by water and chemically resistant to degradation from both acid and alkaline liquid and pneumatic fluids. In a preferred embodiment of the invention, the substrate 10 is a spun bonded polypropylene sheet or web 14 laminated to a melt blown polypropylene sheet or web 15 having a fibrous polypropylene felt 11 needle punched into the substrate. The spun bonded polypropylene forms the upstream side of the substrate and imparts the necessary strength, stability and integrity to the filter medium, and has the ability to deform and retain the discrete, defined minute perforations formed therein for the free passage of fluids while preventing the flow therethrough of oversize particles. The melt blown polypropylene forms the downstream side of the substrate, and it provides a thin, fibrous downstream layer capable of retaining and filtering fine particles, particularly fine metal particles, which manage to pass through the perforations 12.

The fibrous polypropylene felt 11 embodies a fibrous mass to collect, trap and retain a substantial quantity of dirt and debris, but more particularly the polypropylene fibers have a high affinity and attraction for the higher viscosity oil molecules of the undesirable tramp oil.

A preferred polypropylene substrate is made by Kimberly-Clark Corp. of Neenah, Wis. under the designation Evolution Two for the home furnishing market. It is a laminated material about 2.1 oz. per square yard and composed of a spun bonded polypropylene web, about 1.5 oz. per square yard, laminated with a melt blown polypropylene web, about 0.6 oz. per square yard. The spun bonded web and the melt blown sheet are fed in web form through heated embossed rolls which bond and fuse the webs together forming indentations 16 in the spun bonded polypropylene layer and indentations 17 in the melt blown layer to form the laminate.

The fibrous polypropylene felt 11 is preferably made from a web of polypropylene batting needled together, for example, by subjecting it to a needle punching operation of about 500 fine gauge needles per square inch to produce a felt of about 4 oz. per square yard. A felt having these properties is manufactured by West Point-Pepperell, Inc. of West Point, Ga.

The fibrous felt 11 is bonded to the substrate 10 by needle punching through the fibrous felt layer to form the filtration perforations 12 through the substrate while at the same time filling the perforations with polypropylene fibers, some of which penetrate and protrude through the perforations 12 on the downstream surface of the filter medium. The needle punching operation should be carried out with very fine needles, for example, 41 gauge, to produce an array of uniform minute, discrete perforations in the range of from 50 to 1000 per square inch, preferably in the order of about 250 per square inch. The needle punching operation forms the filtration perforations in the substrate, introduces felt fibers into the perforations to improve the filtration and serves to bond the filter to the substrate.

After the needle punching operation, the downstream surface of the filter medium is subjected to heat of a temperature high enough to fuse or at least soften the felt fibers protruding through the perforations in the substrate, thus fusing or adhering the protruding fibers to the substrate and to each other, thereby strengthening the bond between the felt and the substrate and to some extent partially decreasing the size of the perforations. The application of heat must not be so intense as to close the perforations entirely. Although the heat can be applied in various ways, the heat fusing or softening step has been carried out by passing the downstream surface of the substrate across a gas flame with the temperature controlled so that the heat generated melts, fuses or softens the protruding fibers to each other and to the surface of the substrate.

A typical filter medium of the present invention manufactured by the method described herein has the following properties: weight, 6.3 oz. per square yard; thickness, 70 mils; grab tensile stength, 76.5 lbs. lengthwise direction, 83.1 transverse direction; Mullen burst, 137 psi; Frazier air permeability, 40 cfm; particle retention, 5 microns and over.

The filter medium of the present invention has been used successfully and found to have superior filtering capabilities in the circulating cooling systems used in machines for manufacturing aluminum and steel beverage cans in which a 6% low viscosity oil and 94% water emulsion is used as the coolant. The circulating machinery of this type is manufactured by J. R. Schneider Company of Tiberon, Calif. In this type of equipment metal particles, debris and dirty higher viscosity tramp oil find their way into the low viscosity coolant and the filter medium has effectively filtered out the debris and particles 5 microns and over, as well as the more viscous tramp oil with the coolant operating at pressures in a range from about 2 to 30 psi, depending on the condition of the filter medium. The filter medium has not only been used successfully, but it has been found to have a longer life than conventional cellulose filter media and to do a more effective job of filtering out the tramp oil.

Although the present invention has been described in a single preferred form and by way of example only, many variations and modifications can be made therein within the spirit of the invention. For example, for certain applications nylon, polyester or polyethylene felts may be used, but do not have as strong an affinity and attraction for retention of the high viscosity tramp oil as does the filter medium of the present invention. They will, nevertheless, provide a filter medium made from a fusable synthetic fiber structure capable of being bonded to a substrate. Also, the felt fibers protruding through the perforations in the substrate can be bonded to each other and the downstream surface of the substrate by various means other than by heat fusing, such as by chemical fusing. The invention is not intended to be limited to any specific form or embodiment except in so far as such limitations are expressly set forth in the claims.

I claim:

1. A filter medium comprising a relatively strong substrate, said substrate being a laminate of a spun bonded material and a melt blown plastic material, a fibrous thermoplastic felt layer on the spun bonded surface of the substrate upstream to the flow of fluid to be filtered, means bonding the fibrous felt layer to the substrate by fibers needle punched through the fibrous felt layer and the substrate and fused on the downstream surface of the substrate, filtration perforations in the substrate formed by the needle punching and fibers protruding through the perforations on the melt down downstream surface of the substrate and fused on said downstream surface, the spun bonded material imparting the necessary strength, stability and integrity to the filter medium and having the ability to deform and retain discrete defined perforations formed therein for the free passage of fluids while preventing the flow therethrough of oversized particles, the fibrous felt layer collecting, trapping and retaining dirt and debris on the upstream surface of the substrate and the melt blown material and protruding fibers providing a downstream layer capable of retaining and filtering fine particles which pass through the perforations.

2. A filter medium as set forth in claim 1 in which the fibrous felt layer has an affinity for undesirable oils to be filtered from the fluid.

3. A filter medium as set forth in claim 1 in which the fibrous felt layer is a polypropylene fiber batting needled to produce a fibrous felt.

4. A filter medium as set forth in claim 1 in which the substrate is a laminate of a spun bonded polypropylene and a melt blown polypropylene.

5. A filter medium as set forth in claim 1 in which the substrate includes a laminate of a spun bonded polypropylene heat fused in discrete areas to a melt blown polypropylene and in which the fibrous felt layer is on the spun bonded polypropylene surface of the substrate.

6. A filter medium as set forth in claim 5 including a plurality of heat fused indentations on both surfaces of the substrate.

7. A filter medium as set forth in claim 1 in which the fibrous felt layer is a needled batting of polypropylene fibers about 4 oz. per square yard and the substrate is a polypropylene web of about 2.1 oz. per square yard formed of a laminate of a melt blown polypropylene web about 0.6 oz per square yard heat fused to a spun bonded polypropylene web about 1.5 oz. per square yard and in which the laminate is heat fused in discrete areas and in which the fibrous felt layer is bonded to the spun bonded polypropylene surface.

* * * * *